United States Patent [19]

Minor

[11] Patent Number: 4,688,709

[45] Date of Patent: Aug. 25, 1987

[54] WIRE SOLDER FEEDER DEVICE

[76] Inventor: Mathew T. Minor, 51 Springfield Rd., Stafford Springs, Conn. 06076

[21] Appl. No.: 764,670

[22] Filed: Aug. 9, 1985

Related U.S. Application Data

[63] Continuation-in-part of Ser. No. 531,959, Sep. 14, 1983.

[51] Int. Cl.⁴ ............................................ B65H 20/18
[52] U.S. Cl. .................................... 226/128; 226/151; 226/162
[58] Field of Search ............... 226/147, 151, 162, 163, 226/164, 165, 166, 127, 128, 129; 228/52, 53, 41; 219/229, 230, 233; 401/65, 82, 84, 89

[56] References Cited

U.S. PATENT DOCUMENTS

| | | |
|---|---|---|
| 222,618 | 12/1879 | Woodruff . |
| 1,007,236 | 10/1911 | Poirier .................... 226/164 |
| 1,063,697 | 6/1913 | Kendrick . |
| 1,268,877 | 6/1918 | Orme ...................... 228/52 |
| 1,691,052 | 11/1928 | Fay . |
| 1,738,800 | 12/1929 | Schylander . |
| 1,851,420 | 3/1932 | Carson, Jr. . |
| 1,951,545 | 3/1934 | Carson, Jr. .............. 226/151 X |
| 2,058,634 | 10/1936 | Rusk . |
| 2,303,947 | 12/1942 | Moore . |
| 2,454,875 | 11/1948 | Hyde ..................... 226/128 |
| 2,604,064 | 7/1952 | Sefton . |
| 2,797,293 | 6/1957 | Weber, Jr. . |
| 2,803,457 | 8/1957 | Powers .................... 226/164 |
| 2,821,947 | 2/1958 | von Knauf . |
| 2,848,969 | 8/1958 | Shapiro . |
| 2,891,661 | 6/1959 | Woods et al. ............. 226/147 X |
| 2,987,023 | 6/1961 | Cortner . |
| 3,066,841 | 12/1962 | Hancock . |
| 3,070,057 | 12/1962 | Dezzani . |
| 3,101,689 | 8/1963 | Hammond et al. . |
| 3,211,355 | 10/1965 | Zoltai . |
| 3,229,885 | 1/1966 | Hurley . |
| 3,250,453 | 5/1966 | Halstead . |
| 3,252,645 | 5/1966 | Zoltai .................... 226/128 X |
| 3,262,622 | 7/1966 | Conover . |
| 3,356,273 | 12/1967 | Wallace . |
| 3,443,734 | 5/1969 | Fortune . |
| 3,521,804 | 7/1970 | Jacobs . |
| 3,580,448 | 5/1971 | Cagle, Sr. .................. 226/127 |
| 3,707,258 | 12/1972 | Schlitt .................... 228/52 |
| 3,792,228 | 2/1974 | Wei-Cheng ............... 226/127 X |
| 3,796,856 | 3/1974 | Wei-Cheng ............... 226/127 X |
| 3,824,371 | 7/1974 | Schurman, Jr. ............ 226/127 X |
| 3,852,565 | 12/1974 | Kager ..................... 226/128 X |
| 3,883,058 | 5/1975 | Schrotz et al. ............. 226/53 |
| 3,896,982 | 7/1975 | Redman ................... 226/128 |
| 3,966,109 | 6/1976 | Hogan .................... 228/52 |
| 3,999,697 | 12/1976 | Hill, Jr. .................. 226/128 |
| 4,057,186 | 11/1977 | Hedger ................... 226/127 |
| 4,138,048 | 2/1979 | Lemmon .................. 226/152 |
| 4,199,096 | 4/1980 | Keefe et al. .............. 226/127 X |
| 4,247,137 | 1/1981 | St. Clair ................. 228/52 |
| 4,330,075 | 5/1982 | Rosen .................... 228/53 |

Primary Examiner—Harvey C. Hornsby
Assistant Examiner—Scott J. Haugland
Attorney, Agent, or Firm—Chilton, Alix & Van Kirk

[57] ABSTRACT

A hand-held device for advancing a strip of solder or like material includes a body having a receiving end, a nose-like advancing end, and an intermediate pair of upstanding brackets. A swing arm pivotally mounted to the brackets pivotally mounts a spring biased actuating arm. The swing arm and actuating arm have tabs which cooperate to grip and advance a solder strip upon actuation of the actuating arm.

10 Claims, 8 Drawing Figures

WIRE SOLDER FEEDER DEVICE

CROSS-REFERENCE TO RELATED APPLICATION

This application is a continuation-in-part of U.S. patent application Ser. No. 531,959, filed Sept. 14, 1983.

BACKGROUND OF THE INVENTION

This invention relates to feeding a wire strip of solder to a work station. More particularly, this invention is directed to devices which may be manually actuated to advance a wire or solder during a brazing or soldering operation and especially to devices which may be operated by one hand. Accordingly, the general objects of the present invention are to provide novel and improved methods and apparatus of such character.

The well-known practical problem associated with the process of soldering lies in coordinating the tasks of holding the workpiece or workpieces, holding and controlling the soldering implement, and locating and advancing the strip or wire of soldering material. A number of tools have been proposed for addressing the problem of eliminating the necessity of performing one or more of the aforementioned tasks manually involved in the soldering process. Exemplary of such proposed tools are devices wherein various mechanisms for feeding of the solder wire have been adapted for attachment to the soldering implement for manual actuation in conjunction with the operation of the soldering implement. For example, U.S. Pat. No., 4,330,075 discloses a soldering tool with a solder feeder mechanism comprising a manually operated member, which is depressable towards the handle of the soldering tool, and a slide which is displacable in one direction against spring bias by depression of the manually operated member. The slide has a driving dog for displacement of the solder ribbon together with the slide to thereby advance the solder towards the tip of the heating element of the soldering implement. In U.S. Pat. No. 4,247,137, a solder feeder apparatus is disclosed wherein a selective feed of the solder to the heated tip can be accomplished with the same hand that holds the soldering implement. A double-acting slide mechanism feeds the solder forwardly upon actuation of a trigger in the apparatus of U.S. Pat. No. 4,247,137.

The feeder device of the present invention is a hand-held device which is manually actuable to advance a wire or ribbon, for example a strip of solder, in an efficient and reliable manner so that during a brazing or soldering process the operator can concentrate on the task to be performed with minimal attention to the process of advancing the bonding material.

BRIEF SUMMARY OF THE INVENTION

Briefly stated, the invention in a preferred form is a hand-held device for advancing a strip of solder or like material. The device comprises a body having a wire receiving end and a nose-like advancing end and providing a feed path between the receiving and advancing ends. A swing arm, which is pivotally mounted to the body, carries a first gripping means which may be in the form of a tab. A spoon-like advance arm, which is pivotally mounted to the swing arm, carries a second gripping means which also may be in the form a tab. The advance arm is forwardly pivotal from a return position to an advance position. In the return position, the first and second gripping means are out of gripping engagement with the strip of solder or other material which is located in the feed path. Upon pivotal motion to the advance position, the first and second gripping means cooperate on opposite sides of a strip of material within the feed path to grip the material and advance the material toward the advancing end of the device. A spring is employed to return the advance arm to a normally unactuated return position.

An engagement means in the form of a pair of cooperating adjustable fingers may be employed at the advance end to frictionally engage a forward portion of a strip of material. The body forms an upstanding bracket means to mount the interiorly received swing arm. A coiled spring extends between the bracket means and the end of the advance arm. The swing arm is a bifurcated structure, with opposite identical sides, having an upper slot for being pivotally mounted to the bracket means and a lower slot for mounting the advance arm. When the advance arm is manually pivoted to the advance position, the swing arm is also forwardly pivoted.

An object of the invention is to provide a new and improved feeder device which may be efficiently employed in soldering, brazing, welding, and other similar applications.

Another object of the invention is to provide a new and improved feeder device which is adapted for accommodating a wide variety of materials in strip form to feed or advance a strip of the material in measured increments.

Still another object of the invention is to provide a new and improved feeder device of hand-held form which can be easily and efficiently actuated by either hand to advance a solder wire or similar material to a specific location for soldering or a similar joining process.

A further object of the invention is to provide a new and improved feeder device for advancing and straightening a coiled strip of material in a manner which eliminates manual contact and prevents contamination of the strip material.

Yet another object of the invention is to provide a new and improved feeder device for advancing a strip of solder from a spool which device is of an efficient and compact hand-held form and which is relatively easy to employ and actuate.

Other objects and advantages will become apparent from the accompanying drawings and specification.

DETAILED DESCRIPTION OF THE INVENTION

Figure 1:
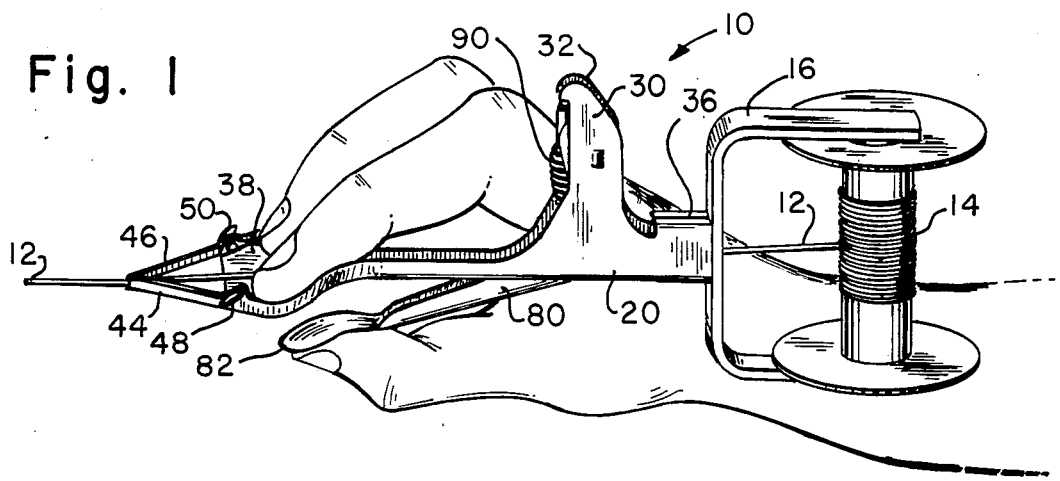
FIG. 1 is a side-perspective view of an embodiment of feeder device in accordance with the present invention illustrated in conjunction with a spool of solder and further illustrating a preferred manner wherein the device may be manually actuated.

With reference to the drawing, wherein like numerals represent like parts throughout the several figures, a hand-held feeder device is generally designated by the numeral 10. With reference to FIG. 1, feeder device 10 is illustrated in its preferred hand-held position wherein the device is manually received in a manner analogous to that of holding a pencil. Feeder device 10 is further illustrated in conjunction with a strip of solder 12 which is coiled around a spool 14. A frame 16, detachably mounted at the rear of feeder device 10, rotatably mounts spool 14. The feeder device of the present invention is adaptable for accommodating a wide variety of attachments for storing and feeding material in strip or wire form such as the frame/spool assembly illustrated in FIG. 1.

Figure 2:
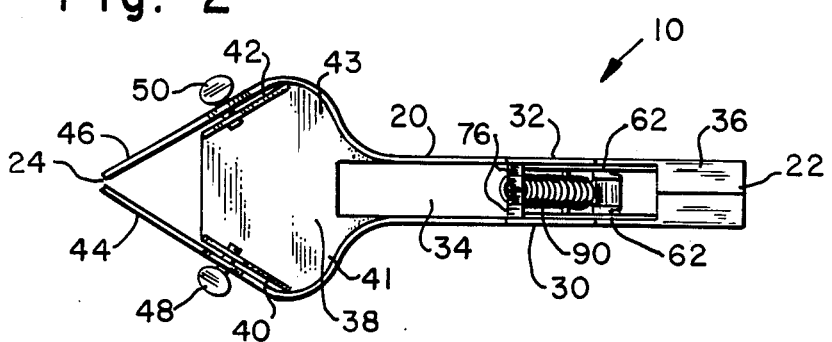
FIG. 2 is a top view of the feeder device of FIG. 1.
Figure 3:
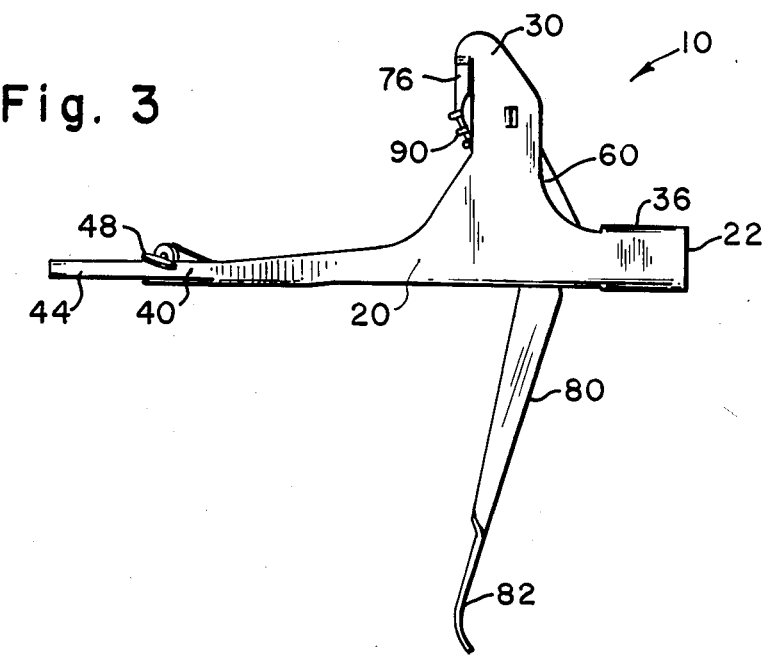
FIG. 3 is a side view of the feeder device of FIG. 1 illustrating the device in an unactuated position.

With further reference to FIG. 2 and FIG. 3, feeder device 10 comprises a body 20 having a rear receiving end 22 and a forward nose-like advancing end 24. Body 20 includes a pair of substantially identical upstanding brackets 30 and 32 which are located intermediate receiving end 22 and advancing end 24. Body 20 further forms a central horizontally disposed slot 34 which is positioned downwardly and forwardly with respect to brackets 30 and 32. A rear housing 36 having a substantially square cross-section is formed at receiving end 22. Housing 36 is adapted to slidably receive and support frame 16 or any other of a variety of attachments which are adapted for feeding strips of material to feeder device 10.

Advancing end 24 includes a horizontally disposed plate 38 which is upwardly bent at opposite forward portions to form a pair of oppositely disposed upstanding flanges 40 and 42. Plate 38 also flares to form a pair of lobes 41 and 43 rearwardly adjacent to flanges 40 and 42, respectively. A pair of elongated and resilient fingers 44 and 46, which are integral with plate 38 in the disclosed embodiment, project forwardly in convergent fashion at the forward tip of advancing end 24. A pair of adjustment screws 48 and 50, which respectively engage flanges 40 and 42, control the spacing between fingers 44 and 46 and respective of flanges 40 and 42 so that the distance between the tips of the fingers may be suitably varied by the adjustment screws. Body 20 thus generally forms a path from receiving end 22 through the forward tips of fingers 44 and 46 so that a strip of solder or similar material may be passed therethough. Fingers 44 and 46 are adjusted by screws 48 and 50 to lightly resiliently engage against opposing sides of solder wire 12. Fingers 44 and 46 may, if deemed necessary or desirable, be provided with generally transverse flanges which form upper and lower guide surfaces for a wire or strip of material being fed through the "nozzle" defined by the free ends thereof.

Figure 4A:
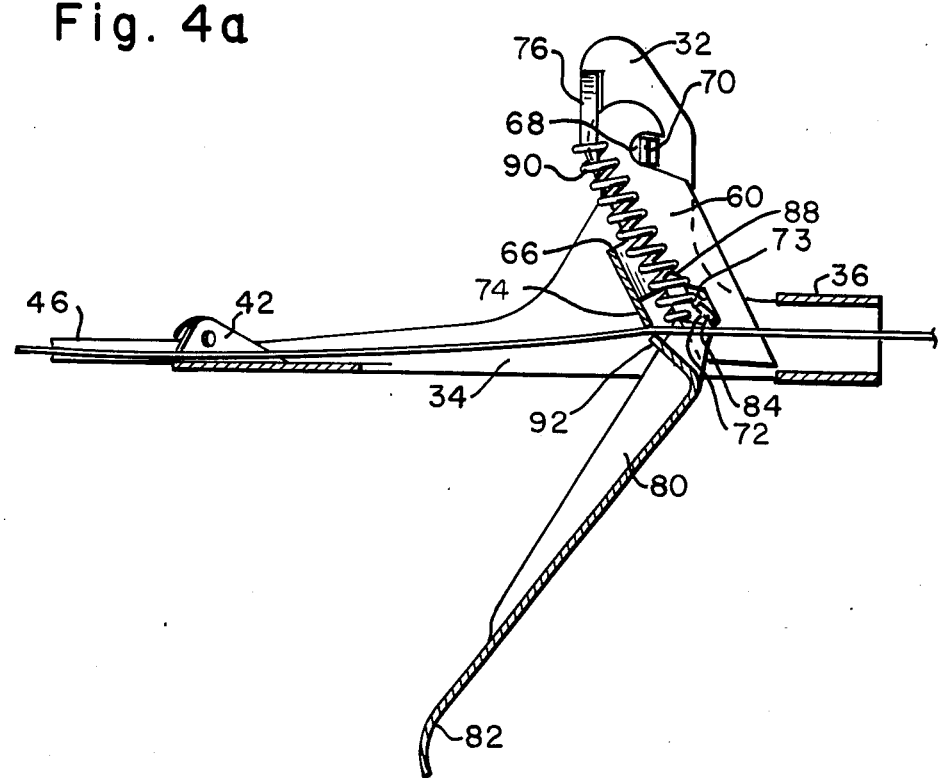
FIG. 4a is a side-sectional view of the feeder device of FIG. 1 illustrating the device in an actuation position.
Figure 4B:
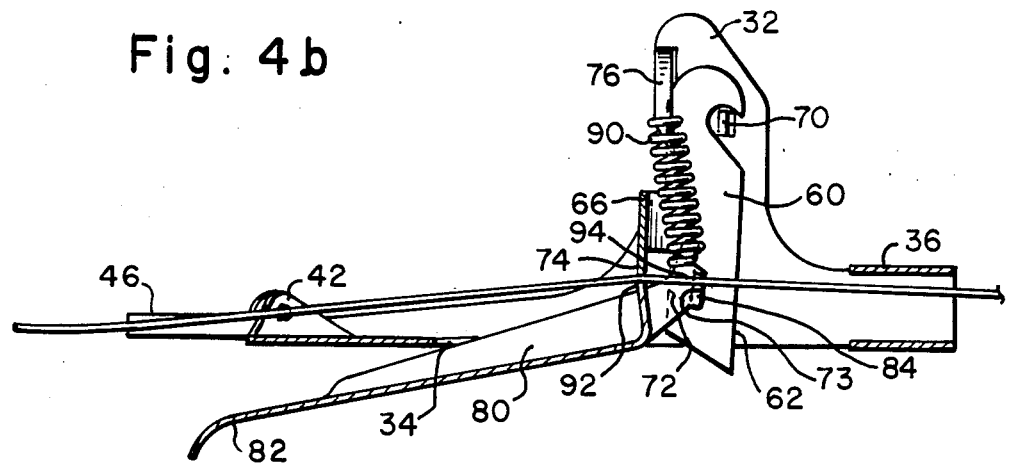
FIG. 4b is side-sectional view of the feeder device of FIG. 1 illustrating the device in a forward advance position.

With further reference to FIG. 4a and FIG. 4b, a swing arm 60 is positioned between brackets 30 and 32 and pivotally mounted thereto. Swing arm 60 is preferably an integral bifurcated structure having opposing substantially identical side panels 62 which are interconnected by a forwardly positioned connecting panel 66. Each side panel 62 defines, at an upper portion, a slot 68 which receives a projection 70. Projections 70 extend interiorly from brackets 30 and 32 to pivotally mount panels 62 of swing arm 60. Each panel 62 of swing arm 60 is also provided at a lower portion with a forwardly oriented lateral slot 72 partially defined by a rear bearing edge 73. Each slot 72 receives an outwardly extending shoulder 84 of an actuating arm 80 to pivotally mount the actuating arm 80 to the swing arm 60.

Connecting panel 66 is generally positioned between brackets 30 and 32 and forms a generally downwardly projecting tab 74. The end of tab 74 is adapted to engage the top of wire 12. Brackets 30 and 32 define, at an upper portion, a pair of integral inward downwardly disposed extensions 76 which cooperate to engage an end of a coiled spring 90. Spring 90 is thus received between panels 62, and spring 90 is interiorly captured, at its lower end to a protruding portion 88 of actuating arm 80.

Actuating arm 80 is an elongated structure which, proximate one end, pivotally mounts to swing arm 60 and at the other end terminates in a spoon-like structure or thumb pad 82. Pad 82 is contoured for engagement by a thumb as illustrated in FIG. 1. At the connecting end, actuating arm 80 is partially received in slot 34 and forms a bifurcated structure having a pair of oppositely disposed outwardly extending shoulders 84. As previously described, shoulders 84 are received in slots 72 of swing arm 60 (only one being illustrated) to pivotally mount actuating arm 80 to swing arm 60. Actuating arm 80 further includes an obliquely oriented protruding portion 88 which, as noted above, interiorly engages the lower end of spring 90. Spring 90 biases actuating arm 80 in a rearward counter-clockwise direction (relative to the drawings) to an unactuated return position as illustrated in FIG. 3. Actuating arm 80 also carries a gripping tab 92 which is adapted to engage the underside of a solder wire 12 as will be more fully described below. A passage 94 is formed at the pivot end of actuating arm 80 between portion 88 and tab 92 to allow solder wire 12 to pass without obstruction from the rear receiving end to the front advancing end of the device.

The operation of feeder device 10 can be appreciated by first referring to FIG. 1 wherein a spool of solder is shown mounted to housing 36 at the receiving end 22 of the device. Solder wire 12 is threaded through housing 36, through passage 94 in arm 80 and forwardly through body 20 to be projected through the "nozzle" defined by the ends or tips forward tips of fingers 44 and 46. Adjustment screws 48 and 50 are suitably tightened so that the tips of fingers 44 and 46 lightly frictionally engage opposite sides of wire 12. The feeder device is manually grasped in a manner analogous to that of holding a pencil wherein the thumb is upwardy pressed against pad 82 and the forefinger and middle fingers are downwardly pressed against opposite lobes 41 and 43 of plate 38. The feeder device 10 is generally illustrated in a horizontal/vertical orientation, although it should be appreciated that the device may be suitably oriented at a wide variety of angles which are comfortable for the operator and advantageous in accomplishing a given task. FIG. 1 shows the feeder device being actuacted to advance solder wire 12 forwardly (toward the left of the drawing). FIG. 3 illustrates the feeder device in the return or non-actuated position into which the feeder device is biased in the absence of manual actuation such as by pressing the thumb against pad 82 in a forwardly clockwise motion.

With further reference to FIG. 4a and FIG. 4b, wire 12 is forwardly advanced by manually forwardly and upwardly pivoting actuating arm 80 from the return position of FIG. 3 to the advance position such as illustrated in FIG. 4b. As the actuating arm is forwardly pivoted from the position of FIG. 3 to the actuating arm position of FIG. 4a, swing arm 60 maintains the oblique orientation of FIG. 4a, the shoulders 84 pivoting in corresponding slots 70 of each of side panels 62. At the wire engagement position of FIG. 4a tab 74 of swing arm 60 and tab 92 of actuating arm 80 cooperate to engage opposite sides of wire 12, thus gripping an intermediate portion of the centrally received solder.

As the actuating arm is further pivoted from the engagement position of FIG. 4a to the advance position illustrated in FIG. 4b, the clockwise pivotal motion of actuating arm 80 is transferred to corresponding pivotal clockwise motion of swing arm 60, thereby resulting in swing arm 60 pivoting from the oblique position of FIG. 4a to a substantially upright vertical position as shown in FIG. 4b. The pivoting of swing arm 60 results from the cooperating engagement of tabs 74 and 92 which essentially locks actuating arm 80 to swing arm 60 so that the arms pivot as a unit, projections 70 forming the pivot. In addition or in the alternative, actuating arm 80 may be locked to arm 60 by the rear surfaces of shoulders 84 engaging against bearing edges 73 of slots 72 as shown in FIG. 4b.

It will be appreciated that the forward pivotal motion of actuating arm and swing arm from the position of FIG. 4a to that of FIG. 4b results in the longitudinal advancement (to the left) of solder wire 12. The forward tip of the solder wire is, for instance, forwardly advanced an incremental distance such as the difference between the forward positions of the end of the solder wire in FIG. 4a and FIG. 4b. Spring 90 is biased to return actuating arm 80 and swing arm 60 to the return positions of FIG. 3. The fingers function to provide a minimal engagement against a forward portion of the solder wire to facilitate disengagement of the solder wire from the tabs and thus prevent the solder wire being rearwardly displaced when the actuating arm is returned to the return position. A sequence of pivotal actuations such as by upwardly pressing the thumb against actuating arm 80 will thus result in a sucession of incremental advances of the solder wire.

It will thus be appreciated that feeder device 10 may be received and actuated with either hand and is suitably adapted for accommodating a wide variety of solder wire diameters or a wide variety of other materials in strip form. While a preferred application of the invention is in the feeding of solder from a spool, the invention may also be advantageously employed in welding, brazing and other applications.

The above-described apparatus may be provided with a swing arm return pressure adjustment which will control the ratio of return grip friction to swing arm return pressure. Such adjustment may be accomplished by slanting the extensions 76 of brackets 30 and 32 toward or away from the swing arm pivot axis.

It is also to be noted that those elements of the above-described feeder device which contact the material being fed may be made replaceable.

Figure 5:
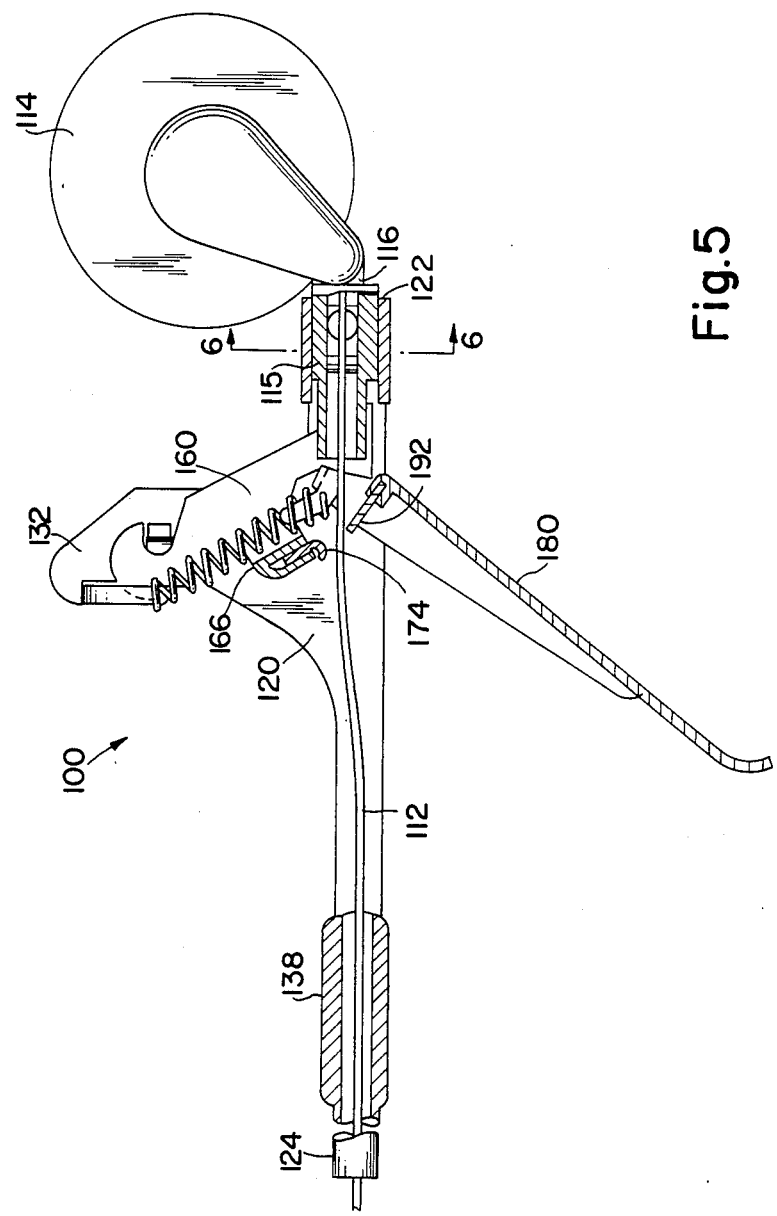
FIG. 5 is a side-sectional view, partly broken away and partly in section, of a second embodiment of a feeder device in accordance with the present invention illustrated in conjunction with a spool of solder.
Figure 6:
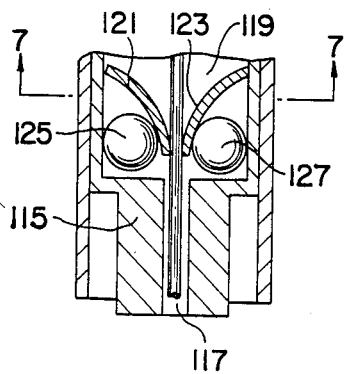
FIG. 6 is a fragmentary top sectional view of the feeder device of FIG. 5.
Figure 7:
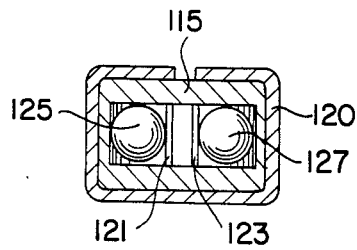
FIG. 7 is a end sectional view of the feeder device taken along the line 7—7 of FIG. 6.

With reference to FIGS. 5 through 7, an alternate form of a feeder device in accordance with the present invention is generally designated by the numeral 100. Feeder device 100 is similar to that previously described for feeder device 10 excepting for noted differences which will be described below. Where applicable, components employed in feeder device 100 will be designated by the numeral 1 followed by a two-digit numeral corresponding to the analogous component of feeder device 10.

A frame 116 rotatably has a forward attachment tongue 115 with a generally rectangular section and a rear bifurcated member for mounting a spool 114. Tongue 115 is received in a rear receiving end 122 for detachably mounting the spool at the rear of feeder device 100. With further reference to FIGS. 6 and 7, frame 116 forms a central guide slot 117 for guiding the solder wire through the device and an enlarged generally enclosed cavity 119. A pair of cooperative leafs 121 and 123 of hardened metal are biased into cooperative engagement with the solder wire at opposite sides thereof by a pair of resilient rubber balls 125 and 127. The leafs are angularly oriented so that the forward ends of the leafs engage the solder wire in a fashion wherein the frictional force exerted by the leafs resists movement of the solder wire in a direction toward the spool (to the right in the drawings) than toward the forward advancing end of the feed device (to the left in the drawings). The foregoing leaf assembly functions to facilitate disengagement of the solder wire from the gripping tabs to prevent the solder wire from being rearwardly displaced upon return of the actuating arm from the advance to the return position.

The body 120 of the feeder device 100 is substantially identical to body 20 excepting at the advancing end wherein a guide tube 124 locates and guides the advancing forward end of the solder wire. The guide tube may be brazed or otherwise secured to a transversely extending plate 138 connecting the body 120. Plate which may be contoured at its upward surface to form a pair of recessed finger pads (not illustrated) for accommodating the fingers of the operator.

A swing arm 160 is positioned between identical spaced brackets 132 (only one illustrated) and pivotally mounted thereto to function in substantially the same manner as swing arm 60. The connecting panel 166 of swing arm 160 forms a slot for closely receiving a generally downwardly projecting replaceable tab 174. Tab 174 is formed of a hardened metal and functions in substantially the same manner as tab 74 to engage the top of solder wire 112.

Actuating arm 180 is substantially identical to actuating arm 80 excepting that it is further configured to form a slot for receiving a replaceable gripping tab 192. Gripping tab 192 is formed of hardened metal and is adapted to function by engaging the underside of the solder wire 112 in a manner similar to gripping tab 92. It should be appreciated that the tabs 174 and 192 are replaceable so that a series of such tabs may be provided for selective replacement in the corresponding slots in order to accommodate a wide dimensional range of solder wire. Accordingly, the foregoing tabs are selectively dimensioned as well as selectively angularly oriented such as by suitable bending so as to properly engage a given solder wire. The foregoing feeder device 100 is particularly applicable for use with relatively thick solder wires.

Feeder device 100 is operated in substantially the same manner as that described for feeder device 10. As the actuating arm 180 is pivoted to the advance position, the clockwise pivotal motion of the actuating arms transfer to the corresponding pivotal clockwise motion of the swing arm 160 thereby resulting in the swing arm 160 pivoting so that the replaceable tabs 174 and 192 engage and longitudinally advance the solder wire. The leafs 121 and 123 function to provide a sufficient resilient engagement against the solder wire so that the solder wire disengages from the tabs to prevent the solder wire from being rearwardly displaced when the actuating arm is returned to the return position. A sequence of pivotal actuations accomplished by upwardly pressing the thumb against the actuating arm 180 will thus result in a succession of incremental advances of the solder wire.

The foregoing feeder device has been described for purposes of illustrating preferred embodiments of the invention and should not be deemed a limitation of the invention herein. Various adaptations, modifications and alternatives may occur to one skilled in the art without departing from the spirit and the scope of the present invention.

What is claimed is:

1. A hand-held and hand-operated device for incrementally feeding a strip of material, comprising a body forming a feed path for receiving strip material and having strip material receiving and discharge ends at rearward and forward ends thereof respectively, an articulated lever pivotally mounted on said body and manually operable along the feed path between rearward and forward positions thereof, the articulated level comprising a swing arm pivotally mounted on said body and an advance arm pivotally mounted on the swing arm and having an extension for said manual operation of the lever, the swing and advance arms having first and second opposed gripping parts on opposite sides of the feed path with the articulated lever in its said rearward position, the swing arm gripping part being pivotal into and out of engagement with strip material in the feed path by pivotal movement of the swing arm in extended and retracted pivotal directions thereof respectively, the advance arm griping part being pivotal into and out of engagement with strip material in the feed path by pivotal movement of the advance arm on the swing arm in extended and retracted pivotal directions thereof respectively, and a spring mounted between said body and advance arm biasing the advance and swing arms in their respective retracted pivotal directions, thereby to pivot the articulated lever rearwardly to its said rearward position and withdraw said first and second opposed griping parts from the feed path, the spring being mounted between said body and advance arm so that said manual operation of the articulated lever from its said rearward position to its said forward position pivots the swing and advance arms in their extended pivotal directions to pivot the opposed gripping parts into engagement with strip material in the feed path and then to feed the strip material forwardly along the feed path with the opposed gripping parts.

2. The device of claim 1 further comprising catch means frictionally engageable against strip material in the feed path with greater resistance against rearward than forward movement of the strip material to prevent rearward movement of the strip material upon rearward pivotal movement of the articulated lever.

3. The device of claim 2 wherein said catch means is mounted on said body adjacent the receiving end thereof and includes a pair of opposed cooperating leaf members frictionally engageable with opposite sides of strip material in the feed path.

4. The device of claim 3 wherein the opposed leaf members are biased toward each other for engagement with strip material in the feed path by a pair of resilient balls.

5. The device of claim 1 wherein said body comprises a socket at its receiving end adapted to receive a holder for mounting a supply reel for supplying strip material to the feed path.

6. The device of claim 1 wherein said body comprises a pair of spacially displaced frame members defining a space therebetween and said swing arm is pivotally mounted on said frame members for pivotal movement within said space.

7. The device of claim 6 wherein said swing arm has a bifurcated structure with spaced generally parallel sides, each having an upper slot for pivotally receiving a projection extending from said frame members and a lower slot for pivotally supporting said advance arm.

8. The device of claim 1 wherein said swing arm forms a slot and said first gripping part is detachably mounted within said slot.

9. The device of claim 1 wherein said advance arm forms a slot and said second griping part is detachably mounted within said slot.

10. The device of claim 1 wherein said body has a guide tube at the discharge end of said body and a generally transversely projecting portion adjacent said guide tube to accommodate the fingers of the user.

* * * * *